(No Model.)
W. A. ESTES.
Plow.
No. 230,623.
Patented Aug. 3, 1880.
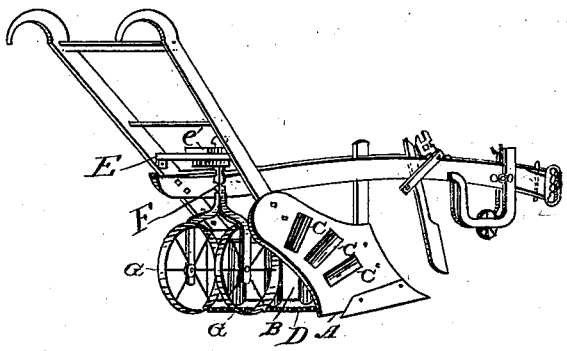
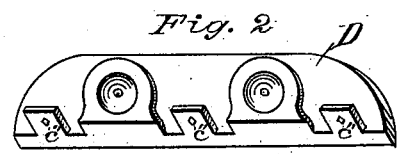
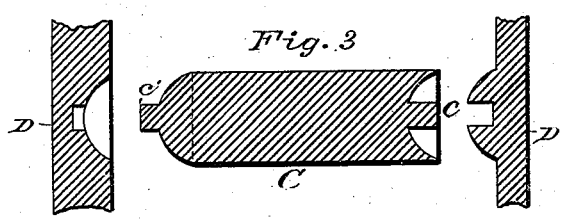
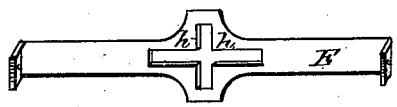
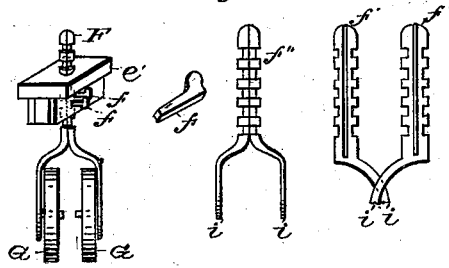
Witnesses
F. S. Eastman
C. L. Eastman
Inventor
William A. Estes
per Herbert M. Sylvester
his Attorney
N. PETERS, PHOTO-LITHOGRAPHER, WASHINGTON, D. C.

UNITED STATES PATENT OFFICE.

WILLIAM A. ESTES, OF FAIRFIELD, MAINE.

PLOW.

SPECIFICATION forming part of Letters Patent No. 230,623, dated August 3, 1880.

Application filed May 19, 1880. (No model.)

*To all whom it may concern:*

Be it known that I, WILLIAM A. ESTES, of Fairfield, in the county of Somerset and State of Maine, have invented certain new and useful Improvements in Plows; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to an improvement in plows in which hollow or solid cylinders of iron or steel are introduced into the landside and mold-board of the plow, and which are inserted into the plow in such a manner that in the passage of the plow through the ground these cylinders or rollers revolve readily, the rollers being inserted into the mold-board at right angles with its line of curvature and into the landside perpendicularly, and in the addition of trucks or wheels at the rear of the plow, they following in the furrow; and the objects of my improvements are, first, to exclude the dust and dirt from the bearings of the rollers, which are used to reduce the friction caused by the plane surfaces of the mold-board and landside being in continuous and unyielding contact with the earth in the passage of the plow through the ground while in operation; second, by the use of wheels or trucks, to afford steadier action and greater ease in holding the plow, and to enable the plowman to adapt his plow easily to any irregularities in the surface of the ground or furrow, each truck or wheel being adjustable separately from the other.

By the use of the wheels or trucks at the rear of the plow the plow may be readily adjusted to any irregularities in the furrow or on the surface of the ground, and serve as a means to steady the plow and afford ease in holding. Frequently the surface of the ground is such and the action of the plow is such that the holder of the plow has to lift continually upon the handle with his left hand to keep the plow where it belongs. This feature in the operation of the plow of its leaving the land is entirely obviated by the trucks at the rear, which, being raised or lowered, as the case may require, will keep the plow in proper position. The trucks being connected with the handles of the plow and revolving on a spindle, the rear end of the plow will be held up by the trucks and be carried by them from one furrow to the other.

My invention consists in the construction and arrangement of the parts, as hereinafter described, and particularly pointed out in the claims.

In the accompanying drawings, Figure 1 represents a rear view of the plow in perspective, showing parts of the mold-board and landside, also the wheels at the rear as attached. Fig. 2 is a view, in perspective, of the bottom of the cap or plate, into which the tops of the rollers, with their journals, are inserted when the cap is in position and in which they revolve when in position and operation. Fig. 3 is a sectional view, showing the construction of the roller and the plates in which it is journaled. Fig. 4 is a detailed view, in perspective, showing the bar with the cross-slots in the center, the carriage with spindle and wheels attached, also the spindle and its parts.

Referring to the drawings, A represents the mold-board, and B the landside of a plow, having the usual beam and handles. The mold-board and landside are slotted, as shown, and in said slots are arranged friction-rollers C C. Each roller C is formed with a lower concave end, having a journal, $c$, and an upper convex end, having a journal, $c'$.

D D are cast-metal plates attached to the mold-board and landside by bolts passing through the ears $c''$, the metal plates D D being fastened to the inside of the mold-board and landside. The upper plate, D, is cast with concave depressions conforming to the convex ends of the roller C, and the lower plate, D, is cast with a convex bearing-surface conforming to the concave end of the roller C, with sockets or boxes in both plates to receive the journals $c$ $c'$. On the upper plate the boxes, in which are the concave depressions with the sockets for the journals $c'$, may be cast solid to the plate or bolted on, the construction of the roller C being such as to exclude the dust and dirt from the journals entirely when in operation in connection with the plates D D, the upper plate D holding the top of the roller in place and being detachable for the purpose of more easily replacing or removing the rollers, and the lower plate D being cast solid to the landside and mold-board or bolted, as may be desired.

E is a bar, connected at either end with the handles of the plow. On the inside and in the center of the bar E are slots $h\ h$, crossing each other at right angles, into which is placed the carriage $e'$, with a round hole in its center, into which the spindle F is inserted in an upward direction from the bottom. The spindle F is kept in position in the carriage $e'$ by the keys $f\ f$, which pass through the carriage $e'$ at the bottom, and beneath the bar E and into the grooves in spindle F, on each side of the spindle. The spindle may turn on these keys, and the said keys, being at the bottom of the carriage $e'$, keep the carriage fast to the bar E. The carriage $e'$ may be lifted out of the bar E after removing the keys $f\ f$, and by turning one-quarter around may be inserted in the slots $h\ h$ in the bar E and moved sidewise or removed, then inserted so as to be moved backward or forward.

The spindle F is composed of two parts, and they may be forged or cast, and are made the one with a tongue and the other with a groove, as seen at $f'\ f'$, each corresponding to the other, so as to form, when united, a whole. When they form the spindle its outer periphery is seen to be grooved horizontally at regular intervals to receive the keys $f\ f$, as shown at $f''$. These pieces being separate and divergent at the bottom, either half may be raised or lowered independent of the other, being held in place by the tongue and groove and the keys $f\ f$. Each half has an arm, $i$, to which, at the bottom, a wheel or truck is attached, which, when the plow is in motion, rolls on the ground and steadies the plow. These trucks or wheels are represented in the drawings by the letters G G. The spindle F revolves in the carriage $e'$ in accordance with the diversity of the furrow or land.

What I claim as my invention, and desire to secure by Letters Patent, is—

1. The combination, with the rollers C, each formed with an upper convex end having a journal, $c'$, and a lower concave end having a journal, $c$, of the plates D D, having respectively the concave depressions and convex elevations with sockets conforming to the convex and concave ends of the rollers, substantially as described.

2. The combination of the bar E, having cross-slots $h\ h$, the carriage $e'$, the divided spindle F, with tongue and groove, as described, the keys $f\ f$, and the trucks or wheels, substantially as and for the purpose set forth.

In testimony that I claim the foregoing as my own I affix my signature in presence of two witnesses.

WILLIAM A. ESTES.

Witnesses:
W. F. CAMERON,
HENRY L. WASHBURN.